US012609301B2

(12) United States Patent
Chen et al.

(10) Patent No.: US 12,609,301 B2
(45) Date of Patent: Apr. 21, 2026

(54) NEGATIVE ELECTRODE PLATE AND LITHIUM ION BATTERY COMPRISING NEGATIVE ELECTRODE PLATE

(71) Applicant: ZHUHAI COSMX BATTERY CO., LTD., Zhuhai (CN)

(72) Inventors: Weiping Chen, Zhuhai (CN); Suli Li, Zhuhai (CN); Panlong Guo, Zhuhai (CN); Lin Chu, Zhuhai (CN); Junyi Li, Zhuhai (CN); Yanming Xu, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 710 days.

(21) Appl. No.: 18/069,775

(22) Filed: Dec. 21, 2022

(65) Prior Publication Data

US 2023/0129049 A1 Apr. 27, 2023

Related U.S. Application Data

(63) Continuation of application No. PCT/CN2021/135863, filed on Dec. 6, 2021.

(30) Foreign Application Priority Data

Dec. 10, 2020 (CN) .......................... 202011440109.9

(51) Int. Cl.
*H01M 4/36* (2006.01)
*H01M 4/62* (2006.01)
(Continued)

(52) U.S. Cl.
CPC ........... *H01M 4/366* (2013.01); *H01M 4/622* (2013.01); *H01M 4/663* (2013.01); *H01M 2004/027* (2013.01)

(58) Field of Classification Search
CPC ...... H01M 4/366; H01M 4/622; H01M 4/663; H01M 2004/027
See application file for complete search history.

(56) References Cited

U.S. PATENT DOCUMENTS

2008/0044733 A1* 2/2008 Ohata ................... H01M 4/621
29/623.5
2015/0340686 A1* 11/2015 Sun ........................ H01M 4/366
429/223

(Continued)

FOREIGN PATENT DOCUMENTS

CN 102473917 A 5/2012
CN 103173161 A 6/2013
(Continued)

OTHER PUBLICATIONS

Machine Translation Relied Upon for JP-2018120706-A (Year: 2018).*

(Continued)

*Primary Examiner* — Marla D McConnell
*Assistant Examiner* — Olivia A Jones
(74) *Attorney, Agent, or Firm* — Westbridge IP LLC

(57) ABSTRACT

Disclosed are a negative electrode plate and a battery. A first negative active material layer is disposed at a bottom layer, and includes a first binder resistant to electrolyte swelling, has a better chemical corrosion resistance, and is not easy to age, so as to ensure long-term bonding, and reduce battery cell expansio. The negative electrode plate can maintain good mechanical strength and elongation at immersion of the electrolyte, so as to ensure that it is not separatedr. A second binder in a second negative active material layer away from the negative current collector uses a high swelling material, the high-swelling binder is in good affinity with the electrolyte, and the electrolyte infiltration speed is good, which facilitates lithium ion conduction. Furthermore, the (Continued)

high-swelling binder is bound to the separator well in a hot pressing process, so as to improve an interface bonding effect.

18 Claims, 1 Drawing Sheet

(51) Int. Cl.
　　*H01M 4/66*　　　　(2006.01)
　　*H01M 4/02*　　　　(2006.01)

(56) References Cited

U.S. PATENT DOCUMENTS

| | | | | |
|---|---|---|---|---|
| 2021/0126257 A1 * | 4/2021 | He | ........................ | H01M 4/366 |
| 2022/0102708 A1 * | 3/2022 | Wang | .................... | H01M 4/386 |
| 2024/0297386 A1 * | 9/2024 | Ogishima | ........... | H01M 50/242 |

FOREIGN PATENT DOCUMENTS

| | | | | | |
|---|---|---|---|---|---|
| CN | 103985841 | A | * | 8/2014 | ........ H01M 10/0525 |
| CN | 104247109 | A | | 12/2014 | |
| CN | 107601490 | A | | 1/2018 | |
| CN | 111204756 | A | | 5/2020 | |
| CN | 111211290 | A | | 5/2020 | |
| CN | 111403749 | A | | 7/2020 | |
| CN | 111584825 | A | | 8/2020 | |
| CN | 111777064 | A | | 10/2020 | |
| CN | 112563453 | A | | 3/2021 | |
| JP | H11297328 | A | * | 10/1999 | |
| JP | 2002050405 | A | | 2/2002 | |
| JP | 2006331707 | A | * | 12/2006 | |
| JP | 2013235795 | A | | 11/2013 | |
| JP | 2014026777 | A | | 2/2014 | |
| JP | 2015103451 | A | | 6/2015 | |
| JP | 2016048652 | A | | 4/2016 | |
| JP | 2018120706 | A | * | 8/2018 | ........ H01M 10/0525 |
| JP | 2019207840 | A | | 12/2019 | |
| KR | 20120069314 | A | | 6/2012 | |
| KR | 20140095980 | A | * | 8/2014 | ............ H01M 4/583 |

OTHER PUBLICATIONS

Machine Translation Relied Upon for JP-H11297328-A (Year: 1999).*

Machine Translation Relied Upon for JP-2006331707-A (Year: 2006).*

Machine Translation Relied Upon for CN-103985841-A (Year: 2014).*

Machine Translation Relied Upon for KR-20140095980-A (Year: 2014).*

Dong, Polymer Analysis Handbook, 2004, pp. 38 and 42, China Petrochemical Press, Beijing, dated Mar. 31, 2004.

First Office Action issued in counterpart Chinese Patent Application No. 202011440109.9, dated Sep. 2, 2021.

International Search Report and Written Opinion issued in corresponding PCT Application No. PCT/CN2021/135863, dated Feb. 23, 2022.

Li, Polymer Physics Experiment, 1996, pp. 68 and 70, Zhejiang University Press, Hangzhou, dated Mar. 31, 1996.

* cited by examiner

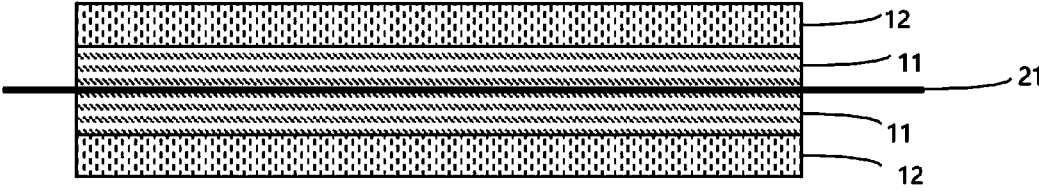

NEGATIVE ELECTRODE PLATE AND LITHIUM ION BATTERY COMPRISING NEGATIVE ELECTRODE PLATE

CROSS-REFERENCE TO RELATED APPLICATIONS

This application is a continuation of International Application No. PCT/CN2021/135863 filed on Dec. 6, 2021, which claims priority to Chinese Patent Application No. 202011440109.9 filed on Dec. 10, 2020. The disclosures of the above-mentioned applications are hereby incorporated by reference in their entireties.

TECHNICAL FIELD

The present disclosure relates to the field of lithium-ion battery technologies, and specifically relates to a negative electrode plate and a lithium ion battery including the negative electrode plate.

BACKGROUND

In recent years, the ever-increasing popularity of new energy vehicles and the rapid development of electronic devices such as laptops and smartphones drive the development and progress of lithium ion battery technology as the core of power supply. In addition, it has also put forward higher and higher requirements for lithium ion batteries, such as higher energy density, faster speed of charging/discharging, better endurance capability, and looser use environment.

Under the fast charging system, without sacrificing the energy density, there are increasingly high demands on the negative charging capacity for lithium ion batteries. In a fast charging process, the negative electrode plate is prone to lithium precipitation and the electrolyte is easily dried up due to side reaction, resulting in failure of a battery. In addition, the fast charging brings problems of higher temperature rising and binder aging, resulting in increasing of hard swell for the negative electrode plate.

At present, main battery factories can improve the fast charging capacity of cells by using double-layer coating technology, that is, the bottom layer uses highly compacted and high capacity graphite, and the upper layer uses fast charging graphite with fast ion transmission function. A binder is an important part of the negative electrode plate, which plays a key role in maintaining the stability of the electrode structure and improving the fast charging capacity. The double-layer coating technology provides more options for balancing the energy density and the fast charging capacity.

SUMMARY

In order to improve the shortcomings in the conventional technologies, an object of the present disclosure is to provide a negative electrode plate and a lithium ion battery including the negative electrode plate. Using the negative electrode plate may resolve the problem of failing to take both dynamic performance for negative electrode and structural stability for the negative electrode plate into account in the fast charging system.

The object of the present disclosure is achieved through the following technical solutions.

A negative electrode plate is provided, where the negative electrode plate includes a negative current collector, a first negative active material layer applied to at least one side of a surface of the negative current collector, and a second negative active material layer; the first negative active material layer is provided on the surface of the negative current collector, and the second negative active material layer is provided on a surface of the first negative active material layer. The first negative active material layer includes a first binder, a solubility parameter of the first binder satisfies a condition of formula (1):

$$|\delta_1 - \delta_0| \geq 4(J \cdot cm^{-3})^{1/2}, \qquad \text{formula (1)}$$

in formula (1), $\delta_1$ denotes the solubility parameter of the first binder, $\delta_0$ denotes the solubility parameter of an electrolyte.

According to the present disclosure, $|\delta_1 - \delta_0|$ is $4(J \cdot cm^{-3})^{1/2}$, $5(J \cdot cm^{-3})^{1/2}$, $6(J \cdot cm^{-3})^{1/2}$, $7(J \cdot cm^{-3})^{1/2}$ or $8(J \cdot cm^{-3})^{1/2}$, or a value in a range of combinations of any two of the above values.

In the present disclosure, the greater difference in the solubility parameters between the first binder and the electrolyte, the more difficult it is for the first binder to swell in the electrolyte (or the poorer compatibility between the first binder and the electrolyte), and the better bonding performance for the first binder, which can ensure that the negative active material layer firmly adheres to a surface of the negative current collector to avoid falling off. In addition, due to the low swelling degree of the first binder in the electrolyte, good mechanical strength and elongation of the first negative active material layer and even the negative electrode plate can be maintained.

According to the present disclosure, the second negative active material layer includes a second binder, and the solubility parameter of the second binder satisfies the condition of formula (2):

$$|\delta_2 - \delta_0| \leq 5(J \cdot cm^{-3})^{1/2}, \qquad \text{formula (2)}$$

in formula (2), $\delta_2$ denotes the solubility parameter of the second binder, $\beta_0$ denotes the solubility parameter of the electrolyte.

Preferably, the solubility parameter of the second binder satisfies the condition of formula (2'):

$$|\delta_2 - \delta_0| \leq 4(J \cdot cm^{-3})^{1/2}, \qquad \text{formula (2')}$$

in formula (2'), $\delta_2$ denotes the solubility parameter of the second binder, and $\delta_0$ denotes the solubility parameter of the electrolyte.

According to the present disclosure, $|\delta_2 - \delta_0|$ is $0(J \cdot cm^{-3})^{1/2}$, $1(J \cdot cm^{-3})^{1/2}$, $2(J \cdot cm^{-3})^{1/2}$, $3(J \cdot cm^{-3})^{1/2}$, $4(J \cdot cm^{-3})^{1/2}$ or $5(J \cdot cm^{-3})^{1/2}$ or a value in a range of combinations of any two of the above values.

In the present disclosure, the smaller difference in the solubility parameters between the second binder and the electrolyte, the more easy it is for the second binder to swell in the electrolyte (or the greater compatibility between the second binder and the electrolyte), the better affinity between the second binder and the electrolyte, and the faster infiltration speed of the electrolyte, which is conducive to lithium ion conduction, and the second binder is bound to a separator well in a hot pressing process, so as to improve an interface bonding effect between the negative active material layer and the separator.

According to the present disclosure, a preferred range of the solubility parameter $\delta_1$ of the first binder is less than or equal to $16(J \cdot cm^{-3})^{1/2}$; preferably is $14(J \cdot cm^{-3})^{1/2}$ to $16(J \cdot cm^{-3})^{1/2}$, for example $14(J \cdot cm^{-3})^{1/2}$, $15(J \cdot cm^{-3})^{1/2}$ or $16(J \cdot cm^{-3})^{1/2}$ or a value in a range of combinations of any two of the above values.

According to the present disclosure, a preferred range of the solubility parameter $\delta_2$ of the second binder ranges from $18(J \cdot cm^{-3})^{1/2}$ to $25(J \cdot cm^{-3})^{1/2}$, for example $18(J \cdot cm^{-3})^{1/2}$, $19(J \cdot cm^{-3})^{1/2}$, $20(J \cdot cm^{-3})^{1/2}$, $21(J \cdot cm^{-3})^{1/2}$, $22(J \cdot cm^{-3})^{1/2}$, $23(J \cdot cm^{-3})^{1/2}$, $24(J \cdot cm^{-3})^{1/2}$ or $25(J \cdot cm^{-3})^{1/2}$ or a value in a range of combinations of any two of the above values.

According to the present disclosure, the solubility parameter $\delta_0$ of the electrolyte ranges from $18(J \cdot cm^{-3})^{1/2}$ to $21(J \cdot cm^{-3})^{1/2}$, for example $18(J \cdot cm^{-3})^{1/2}$, $19(J \cdot cm^{-3})^{1/2}$, $20(J \cdot cm^{-3})^{1/2}$ or $21(J \cdot cm^{-3})^{1/2}$ or a value in a range of combinations of any two of the above values.

In the present disclosure, the solubility parameter refers to cohesive energy of a unit volume of a binder or an electrolyte, which is obtained through calculation of a square root of a cohesive energy density of a unit volume of the binder, or a square root of a cohesive energy density of a unit volume of the electrolyte.

In the present disclosure, the solubility parameter is measured by the following methods:

$$\delta_{mixed} = \delta_a * \Phi_a + \delta_b * \Phi_b + \dots + \delta_n * \Phi_n$$

where $\delta$ denotes the solubility parameter for each component, and $\Phi$ denotes the volume fraction for each component in the whole system.

The solubility parameter of each component is the square root of a cohesive energy density of a unit volume of the component.

According to the present disclosure, the first binder is selected from a homopolymer polymerized with one monomer of butadiene, phenylethylene, propenoic acid, acrylic ester (such as acrylic acid methyl ester, 2-ethylhexyl acrylate, and butylacrylate), methacrylate (such as methyl methacrylate, methyl methacrylate isooctyl, and butyl methacrylate), a copolymer polymerized with at least two of the monomers, or a modified product (the modification, for example, includes surface modification) of the homopolyer or the copolymer.

For example, the first binder is selected from at least one of: a copolymer polymerized with propenoic acid, butadiene and phenylethylene, a copolymer polymerized with phenylethylene and methyl methacrylate, and a copolymer polymerized with phenylethylene, 2-ethylhexyl acrylate, methyl methacrylate and butylacrylate.

According to the present disclosure, the second binder is selected from a homopolymer polymerized with one monomer of butadiene, phenylethylene, propenoic acid, vinyl cyanide, acrylamide, acrylic ester (such as acrylic acid methyl ester, 2-ethylhexyl acrylate, and butylacrylate), methacrylate (such as methyl methacrylate, methyl methacrylate isooctyl, and butyl methacrylate), a copolymer polymerized with at least two of the monomers or a modified product (the modification, for example, includes surface modification) of the homopolyer or the copolymer.

For example, the second binder is selected from at least one of: the copolymer polymerized with propenoic acid, butadiene and phenylethylene, a copolymer polymerized with propenoic acid and acrylamide, a copolymer polymerized with propenoic acid, vinyl cyanide, and acrylamide, the copolymer polymerized with phenylethylene and methyl methacrylate, and the copolymer polymerized with phenylethylene, 2-ethylhexyl acrylate, methyl methacrylate and butylacrylate.

In the present disclosure, the solubility parameter of the first binder is adjusted by adjusting a feed ratio of each polymer monomer in the first binder.

In the present disclosure, the solubility parameter of the second binder is adjusted by adjusting a feed ratio of each polymer monomer in the second binder.

According to the present disclosure, a thickness ratio of the first negative active material layer to the second negative active material layer is 2~8:8~2, for example, 2:8, 3:7, 4:6, 5:5, 6:4, 7:3, or 8:2.

According to the present disclosure, the thicknesses of the first negative active material layer and the second negative active material layer are not particularly limited, as long as can be applied to the system of the present disclosure.

According to the present disclosure, the negative current collector may be conductive copper foil or copper foil with a functional layer.

According to the present disclosure, the first negative active material layer further includes a first thickener, a first conductive agent and a first negative active material.

According to the present disclosure, the second negative active material layer further includes a second thickener, a second conductive agent and a second negative active material.

The first thickener and the second thickener are the same or different, the first conductive agent and the second conductive agent are the same or different, and the first negative active material and the second negative active material are the same or different.

According to the present disclosure, a mass percentage of each component in the first negative active material layer is as follows: 70 wt % to 98.5 wt % of the first negative active material, 0.5 wt % to 10 wt % of the first conductive agent, 0.5 wt % to 10 wt % of the first binder and 0.5 wt % to 10 wt % of the first thickener.

Preferably, the mass percentage of each component in the first negative active material layer is as follows: 85 wt % to 97 wt % of the first negative active material, 1 wt % to 5 wt % of the first conductive agent, 1 wt % to 5 wt % of the first binder and 1 wt % to 5 wt % of the first thickener.

According to the present disclosure, a mass percentage of each component in the second negative active material layer is as follows: 70 wt % to 98.5 wt % of the second negative active material, 0.5 wt % to 10 wt % of the second conductive agent, 0.5 wt % to 10 wt % of the second binder and 0.5 wt % to 10 wt % of the second thickener.

Preferably, the mass percentage of each component in the second negative active material layer is as follows: 85 wt % to 97 wt % of the second negative active material, 1 wt % to 5 wt % of the second conductive agent, 1 wt % to 5 wt % of the second binder and 1 wt % to 5 wt % of the second thickener.

The first conductive agent and the second conductive agent are the same or different, and are independently selected from at least one of: conductive carbon black, acetylene black, ketjen black, Super P, carbon fiber, carbon nanotube, graphene and carbon fiber.

The first negative active material and the second negative active material are the same or different, and are independently selected from at least one of: artificial graphite, natural graphite, nano-silicon, Si—C composites, Si—O—C composites, hard carbon or soft carbon.

Particularly, when the first negative active material is different from the second negative active material, the charging capacity of the first negative active material is weaker than that of the second negative active material.

For example, the first negative active material is selected from highly compacted graphite, and the second negative active material is selected from fast charging graphite.

The first thickener and the second thickener are the same or different, and are independently selected from at least one of: sodium carboxymethylcellulose, carboxymethyl cellulose lithium, sodium alginate and polyacrylic acid.

According to the present disclosure, a length and width of the negative current collector is not particularly defined, and different lengths and widths of the negative current collector may be selected according to different cells required. For example, the length of the negative current collector ranges from 80 cm to 170 cm, preferably 100 cm to 150 cm, and the width of the negative current collector ranges from 10 mm to 150 mm, preferably 50 mm to 100 mm.

The present disclosure further provides a lithium ion battery, which includes the negative electrode plate mentioned above.

Furthermore, the lithium ion battery further includes a positive plate, a separator and an electrolyte.

In the present disclosure, the negative electrode plate with smaller swelling degree at immersion of the electrolyte can maintain good mechanical strength and elongation, so as to ensure that the negative active material layer is not separated from the negative current collector. A second binder in a second negative active material layer away from the negative current collector uses a high swelling material with a solubility parameter similar to that of the electrolyte, so that the high-swelling binder is in good affinity with the electrolyte, and the electrolyte infiltration speed is good, which facilitates lithium ion conduction. Furthermore, the high-swelling binder is bound to the separator well in a hot pressing process, so as to improve an interface bonding effect between the negative active material layer and the separator.

The beneficial effects of the present disclosure are as follows.

The present disclosure provides a negative electrode plate and a lithium ion battery including the negative electrode plate. The first negative active material layer in the negative electrode plate is disposed at the bottom layer (close to the negative current collector), and includes a first binder resistant to electrolyte swelling, has a better chemical corrosion resistance, and is not easy to age, so as to ensure long-term bonding between the first negative active material and the negative current collector, and reduce battery cell expansion under fast charging.

Furthermore, in the present disclosure, a second negative active material layer is further disposed at the top layer (away from the negative current collector) of the negative electrode plate, and includes a second binder with high-swelling and fast charging and being in good affinity with the electrolyte, which promotes infiltration of the electrolyte and conduction of the lithium ion. In addition, the high-swelling binder is bound to the separator well, so as to ensure interface bonding. Furthermore, through cooperation with the first negative active material layer, both the energy density and fast charging capacity may be taken into account, ensuring the performance balance of a cell under extreme design.

BRIEF DESCRIPTION OF THE DRAWINGS

FIG. 1 is a schematic structural diagram of a negative electrode plate of the present disclosure.

DETAILED DESCRIPTIONS OF THE EMBODIMENTS

<Highly Compacted Graphite and Fast Charging Graphite>

In an embodiment of the present disclosure, the highly compacted graphite refers to the graphite with fast charging capacity below 2C, that is, a charging rate of the highly compacted graphite is less than 2C; for example, 1C highly compacted graphite, 1.5C highly compacted graphite or 2C highly compacted graphite.

In an embodiment of the present disclosure, the fast charging graphite refers to the graphite with fast charging capacity above 3C, that is, the charging rate of the fast charging graphite is more than 3C; for example, 3C fast charging graphite, 5C fast charging graphite, 8C fast charging graphite or 10C fast charging graphite.

In an embodiment of the present disclosure, ultimate compacted densities of the highly compacted graphite and the fast charging graphite are related to their respective rates, and this is mainly because the fast charging graphite with different charging capabilities have different ultimate compacted densities due to different raw materials and doping and coating processes.

In an embodiment of the present disclosure, the ultimate compacted density of the highly compacted graphite ranges from 1.75 mg/cm$^3$ to 2 mg/cm$^3$. For example, when the highly compacted graphite is the 1.5C highly compacted graphite, the ultimate compacted density is 1.83 mg/cm$^3$.

In an embodiment of the present disclosure, the ultimate compacted density of the fast charging graphite ranges from 1.5 mg/cm$^3$ to 1.8 mg/cm$^3$. For example, when the fast charging graphite is 3C fast charging graphite, the ultimate compacted density is 1.78 mg/cm$^3$; when the fast charging graphite is 5C fast charging graphite, the ultimate compacted density is 1.75 mg/cm$^3$; and when the fast charging graphite is 10C fast charging graphite, the ultimate compacted density is 1.55 mg/cm$^3$.

In an embodiment of the present disclosure, capacity per gram of the highly compacted graphite ranges from 360 mAh/g to 365 mAh/g.

In an embodiment of the present disclosure, capacity per gram of the fast charging graphite ranges from 340 mAh/g to 355 mAh/g.

The present disclosure will be further described in detail with reference to specific embodiments hereinafter. It should be understood that the following embodiments are only illustratively explicating and explaining the present disclosure, and should not be interpreted as limiting the protection scope of the present disclosure. All technologies implemented based on the foregoing contents of the present disclosure fall with the scope intended to protect by the present disclosure.

The experiment methods used in the following examples are conventional methods unless otherwise specified; and the reagents, materials, or the like, used in the following examples may be all obtained from commercial sources unless otherwise specified.

In the description of the present disclosure, it should be noted that the terms "first", "second", or the like, are only used for descriptive purposes, and do not indicate or imply relative importance.

The solubility parameters used in the following examples refer to cohesive energy of a unit volume of a binder or an electrolyte, which are obtained through calculation of a square root of a cohesive energy density of a unit volume of the binder or a square root of a cohesive energy density of a unit volume of the electrolyte.

The solubility parameters used in the following examples are measured by the following methods:

$$\delta_{mixed} = \delta_a * \Phi_a + \delta_b * \Phi_b + \dots + \delta_n * \Phi_n$$

where $\delta$ is a solubility parameter for each component, and $\Phi$ is a volume fraction for each component in the whole system.

The solubility parameter for each component is a square root of a cohesive energy density of a unit volume of the component.

Examples 1~7 and Comparative Examples 1~4

The preparation processes in Examples 1~7 are the same as those in Comparative Examples 1-4, and the difference is a structure of the negative electrode plate. The specific operation is as follows:

Mixing a positive active material (lithium cobaltate), a conductive agent (super-p) and a binder (PVDF) in a mass ratio of 97:2:1, adding the mixture into N-methyl pyrrolidone, evenly stirring and then applying the mixture to a positive current collector (aluminum foil). After drying at a temperature of 90° C., performing rolling by using a roller presser, followed by cutting, slitting, vacuum baking, and tab welding to obtain a positive plate.

Mixing ethylene carbonate (EC), propylene carbonate (PC), diethyl carbonate (DEC), propyl propionate (PP) and ethyl propionate (EP) in a volume ratio of 15:15:10:60 evenly, then adding $LiPF_6$ into the mixture to obtain 1 mol/L of electrolyte, and adding 2 wt % of vinylene carbonate (VC) and 5 wt % of fluoroethylene carbonate as additives to obtain an electrolyte; and calculating a solubility parameter of the electrolyte as $21.6(J \cdot cm^{-3})^{1/2}$. Preparing slurry 1 and slurry 2 with a negative active material (artificial graphite), a conductive agent (super-p), a thickener (CMC) and a binder (as shown in Table 1) in a mass ratio of 96:1.0:1.5: 1.5, applying the slurry 1 and the slurry 2 to copper foil simultaneously through a double-die head coating device, of which the slurry 1 is at a bottom layer and the slurry 2 is at a top layer. After drying at a temperature of 80° C., performing rolling by using a roller presser, followed by cutting, slitting, vacuum baking, and tab welding to obtain a negative electrode plate, whose structure is shown in FIG. 1, where 11 is a first negative active material layer formed by slurry 1, 12 is a second negative active material layer formed by slurry 2, and 21 is a current collector layer.

Performance Test:

(1) Negative Electrode Plate Peeling Force:

Cutting the obtained negative electrode plate to obtain test samples with a size of 20×100 cm for later use; bonding the negative electrode plate on a side that needs to be tested with a double-sided adhesive and compacting it with a press roller to completely fit the negative electrode plate; pasting the other side of the double-sided adhesive on the test sample to a surface of a stainless steel, bending one end of the test sample reversely with an angle of bending of 180°; using a high-strength tensile machine to fix one end of the stainless steel to a lower clamp of the tensile tester, fixing the bending end of the sample to an upper clamp, adjusting an angle of the sample to ensure the upper end and the lower end to be keep in the upright position, and then stretching the sample at a speed of 50 mm/min until all the samples are peeled off from a substrate; and recording a displacement and force during the process, and using a force during stress balance as a peeling strength of the negative electrode plate. The results are recorded in Table 2.

(2) Cell DCR:

Letting a 50% SOC cell stand for 4 hours at 0° C., discharging 10 s at 0.1C, recording a terminal voltage as $V_0$, then discharging 100 s at 1C, and recording the voltage for discharging 10 s as $V_1$. In this case, $DCIR=(V_1-V_0)/(1C-0.1C)$. The results are recorded in Table 2.

(3) Cycle Life:

Letting a battery stand for 3 hours at an environment of $(25\pm3)°$ C.; when the cell reaches $(25\pm3)°$ C., charging the battery to 4.25V at 3C, then charging at 2.5C to 4.35, after that charging at 1.5C to 4.45V, and then charging at 0.7C to 4.48V; then charging at a constant voltage of 4.48V to the cut-off electric current of 0.05C, and discharging to 3V at 0.5C, and recording the initial capacity as Q0; and cycling until a capacity retention reaches 80%, regarding a previous discharging capacity as the capacity of the battery Q2, and calculating the capacity retention (%). The results are recorded in Table 2. The formula used is as follows: capacity retention (%)=Q2/Q0×100%.

(4) Lithium Precipitation:

Letting a lithium ion battery in a 10° C. constant temperature box stand for 30 minutes so that the lithium ion battery reaches constant temperature; discharging the lithium ion battery reached the constant temperature at 2C constant electric current to a lower limit voltage (2.7V); then charging the lithium ion battery at 2C constant electric current to an upper limit voltage (4.3V), and charging at a constant voltage to the electric current 0.5C. After cycling 20 times according to the above method, disassembling the lithium ion battery, and observing the lithium precipitation on the negative electrode plate. The results are recorded in Table 2.

(5) End of Life (EOL) Expansion Rate:

Testing a thickness D0 of a fully charged cell before the test, letting the battery stand for 3 hours at an environment of $(25\pm3)°$ C.; when the battery reaches $(25\pm3)°$ C., charging the battery to 4.25V at 3C, then charged at 2.5C to 4.35V, after that charging at 1.5C to 4.45V, and then charging at 0.7C to 4.48V; then charging at a constant voltage of 4.48V to the cut-off electric current of 0.05C, and discharging to 3V at 0.5C; in this way, when the cyclic number reaches a required number or a capacity attenuation rate reaches 80% or the thickness exceeds a thickness required by the test, fully charging the battery again; and taking the cell out from the battery, letting the cell stand for 3 hours at room temperature, testing the fully charged thickness D3 at this time, and calculating a thickness changed rate (%). The results are recorded in Table 2. The formula used is thickness changed rate (%)=(D3−D0)/D0×100%.

TABLE 1

Composition of the negative electrode plates in Examples 1~7 and Comparative Examples 1~4

| | First binder | Solubility parameter $(J \cdot cm^{-3})^{1/2}$ | Thickness of the first negative active material layer μm | First negative active material | Second binder | Solubility parameter $(J \cdot cm^{-3})^{1/2}$ | Thickness of the second negative active material layer μm | Second negative active material |
|---|---|---|---|---|---|---|---|---|
| Example 1 | binder a | 15-16 | 70 | Gra. 1 | binder b | 20-21 | 40 | Gra. 1 |
| Example 2 | binder a | 15-16 | 70 | Gra. 1 | binder c | 19-21 | 40 | Gra. 1 |
| Example 3 | binder a | 15-16 | 70 | Gra. 1 | binder d | 21-23 | 40 | Gra. 1 |
| Example 4 | binder a | 15-16 | 70 | Gra. 1 | binder e | 22-24 | 40 | Gra. 1 |
| Example 5 | binder a | 15-16 | 70 | Gra. 1 | binder b | 20-21 | 40 | Gra. 2 |
| Example 6 | binder a | 15-16 | 65 | Gra. 1 | binder b | 20-21 | 45 | Gra. 2 |
| Example 7 | binder a | 15-16 | 60 | Gra. 1 | binder b | 20-21 | 50 | Gra. 2 |
| Comparative Example 1 | binder a | 15-16 | 70 | Gra. 1 | binder a | 15-16 | 40 | Gra. 1 |
| Comparative Example 2 | binder c | 19-21 | 70 | Gra. 1 | binder c | 19-21 | 40 | Gra. 1 |
| Comparative Example 3 | binder a | 15-16 | 70 | Gra. 1 | binder a | 15-16 | 40 | Gra. 2 |
| Comparative Example 4 | binder b | 20-21 | 70 | Gra. 1 | binder a | 15-16 | 40 | Gra. 1 |

The composition of the binder a is a copolymer polymerized with propenoic acid, butadiene and phenylethylene.
The composition of the binder b is a copolymer polymerized with phenylethylene and methyl methacrylate.
The composition of the binder c is a copolymer polymerized with phenylethylene, 2-ethylhexyl acrylate, methyl methacrylate and butylacrylate.
The composition of the binder d is a copolymer polymerized with propenoic acid and acrylamide.
The composition of the binder e is a copolymer polymerized with propenoic acid, vinyl cyanide and acrylamide.
Gra. 1 is 1.5 C highly compacted graphite, and the compacted density is 1.8 mg/cm³.
Gra. 2 is 3 C fast charging graphite, and the compacted density is 1.72 mg/cm³.

TABLE 2

Performance testing results of the batteries and plates in Examples 1~7 and Comparative Examples 1~4

| | Peeling force of the plate N/m | Cell DCR mΩ | Energy density WH/L | Cycle life | Lithium precipitation | EOL expansion rate |
|---|---|---|---|---|---|---|
| Example 1 | >10 | 146 | 722 | Satisfies 800 cycles | no | 9.25% |
| Example 2 | >10 | 148 | 722 | Satisfies 800 cycles | no | 9.23% |
| Example 3 | >10 | 152 | 720 | Satisfies 800 cycles | no | 9.21% |
| Example 4 | >10 | 155 | 724 | Satisfies 800 cycles | slight | 10.51% |
| Example 5 | >10 | 140 | 719 | Satisfies 900 cycles | no | 8.54% |
| Example 6 | >10 | 138 | 719 | Satisfies 900 cycles | no | 8.58% |
| Example 7 | >10 | 135 | 720 | Satisfies 900 cycles | no | 8.55% |
| Comparative Example 1 | >10 | 183 | 721 | Satisfies 500 cycles | serious | 16.33% |
| Comparative Example 2 | >8 | 144 | 710 | Satisfies 650 cycles | no | 12.88% |
| Comparative Example 3 | >10 | 170 | 719 | Satisfies 600 cycles | medium | 11.79% |
| Comparative Example 4 | >8 | 142 | 708 | Satisfies 500 cycles | no | 13.13% |

From the test results in Table 2, it may be seen that the peeling forces of the plate in the examples have no significant change compared with those in the comparative examples, and the peel strengths of the plates in Comparative Example 2 and Comparative Example 4 have decreased slightly due to the high-swelling binder used at the bottom layer.

According to the data of the cell DCRs, the DCRs in Examples 1~7 have decreased significantly compared with those in Comparative Example 1 and Comparative Example 3. This is because a high-swelling binder with better dynamic performance is used at the top layer of the plate in the batteries of Examples 1~7 compared with Comparative Example 1 and Comparative Example 3, so that the cell DCRs decrease significantly; and the cell DCRs in Comparative Example 2 and Comparative Example 4 are the lowest, because the high-swelling binder with better dynamic performance is used at the top layer and the bottom layer of the plate in the batteries of Comparative Example 2 and Comparative Example 4.

From the cycle life, the cycle life of the batteries in Examples 1~7 are significantly higher than that in Comparative Examples 1~4, where the binder with good high-swelling dynamic performance is used at the top layer of the plate in Examples 1~4, which improves the charging capacity of the cell at 2C, and the cyclic stability is good, so that the cycle life is improved significantly. The fast charging graphite is used at the top layer of the plate in Examples 5~7, which further improves the dynamic performance of the cell and the cycle life. In Comparative Example 1, due to the poor dynamic performance of the graphite and the binder, the cell is prone to lithium precipitation under the circulation at 2C, resulting in a rapid attenuation of the capacity retention; and the performance in the comparative 3 is improved by switching to the fast charging graphite. The binder with high-swelling dynamic performance is used at the top layer and the bottom layer in the plate of Comparative Example 2, the cycle life has improved; however, the decrease of the peeling strength caused by the high-swelling binder makes the plate be prone to demould during the circulation, resulting in the cycle life being lower than that of Examples 1~7.

From the EOL expansion rate, the EOL expansion rates of the lithium ion batteries in Examples 1~7 are lower than those in Comparative Examples 1~4, it is known from cell disassembly that, in addition to hard swell, lithium precipitation of the plate has a greater impact on the expansion. In Examples 1~7, based on selection of binder systems with different swelling degrees for the upper layer and the bottom layer, the problem of hard swell caused by binder absorbency and the problem of the lithium precipitation and incrassation caused by insufficient dynamics are both taken into account. The overall EOL expansion rate has decreased and the cycle life has improved compared with those in Comparative Examples 1~4.

The implementations of the present disclosure have been illustrated above. However, the present disclosure is not limited to the above-mentioned implementations. Any modification, equivalent replacement, improvement, or the like, made within the spirit and principles of the present disclosure shall fall within the protection scope of the present disclosure.

What is claimed is:

1. A negative electrode plate, wherein the negative electrode plate comprises a negative current collector, a first negative active material layer applied to at least one side of a surface of the negative current collector, and a second negative active material layer; the first negative active material layer is provided on the surface of the negative current collector, and the second negative active material layer is provided on a surface of the first negative active material layer; and the first negative active material layer comprises a first binder, a solubility parameter of the first binder satisfies a condition of formula (1):

(1)

$$|\delta_1 - \delta_0| \geq 4(J \cdot cm^{-3})^{1/2}, \qquad \text{formula (1)}$$

in formula (1) $\delta_1$ denotes the solubility parameter of the first binder, $\delta_0$ denotes a solubility parameter of an electrolyte; and the first negative active material layer further comprises a first negative active material, and the second negative active material layer further comprises a second negative active material;

the first negative active material is a highly compacted graphite, and the second negative active material is a fast charging graphite;

the highly compacted graphite refers to a graphite with a fast charging capacity below 2C, and an ultimate compacted density of the highly compacted graphite ranges from 1.75 $mg/cm^3$ to 2 $mg/cm^3$;

the fast charging graphite refers to a graphite with a fast charging capacity above 3C, and an ultimate compacted density of the fast charging graphite ranges from 1.5 $mg/cm^3$ to 1.8 $mg/cm^3$;

and a capacity per gram of the highly compacted graphite ranges from 360 mAh/g to 365mAh/g, and a capacity per gram of the fast charging graphite ranges from 340 mAh/g to 355 mAh/g.

2. The negative electrode plate according to claim 1, wherein $|\delta_1 - \delta_0|$ ranges from 5 to 8$(J \cdot cm^{-3})^{1/2}$.

3. The negative electrode plate according to claim 1, wherein $|\delta_1 - \delta_0|$ ranges from 6 to 8$(J \cdot cm^{-3})^{1/2}$.

4. The negative electrode plate according to claim 1, wherein the second negative active material layer comprises a second binder, a solubility parameter of the second binder satisfies a condition of formula (2):

$$|\delta_2 - \delta_0| \leq 5(J \cdot cm^{-3})^{1/2}, \qquad \text{formula (2)}$$

in formula (2), $\delta_2$ denotes the solubility parameter of the second binder, $\delta_0$ denotes the solubility parameter of the electrolyte.

5. The negative electrode plate according to claim 4, wherein the solubility parameter of the second binder satisfies the condition of formula (2'):

$$|\delta_2 - \delta_0| \leq 4(J \cdot cm^{-3})^{1/2}. \qquad \text{formula (2')}$$

6. The negative electrode plate according to claim 4, wherein $|\delta_2 - \delta_0|$ ranges from 0 to 3 $(J \cdot cm^{-3})^{1/2}$.

7. The negative electrode plate according to claim 1, wherein the solubility parameter $\delta_1$ of the first binder is less than or equal to 16$(J \cdot cm^{-3})^{1/2}$.

8. The negative electrode plate according to claim 7, wherein the solubility parameter $\delta_1$ of the first binder is 14 to 16$(J \cdot cm^{-3})^{1/2}$.

9. The negative electrode plate according to of claim 4, wherein the solubility parameter $\delta_2$ of the second binder ranges from 18$(J \cdot cm^{-3})^{1/2}$ to 25$(J \cdot cm^{-3})^{1/2}$.

10. The negative electrode plate according to of claim 1, wherein the solubility parameter $\delta_0$ of the electrolyte ranges from 18$(J \cdot cm^{-3})^{1/2}$ to 21$(J \cdot cm^{-3})^{1/2}$.

11. The negative electrode plate according to claim 1, wherein the first binder is selected from a homopolyer polymerized with one monomer of butadiene, phenylethylene, propenoic acid, acrylic ester, methacrylate, a copolymer polymerized with at least two of the monomers, or a modified product of the homopolyer or the copolymer.

12. The negative electrode plate according to claim 11, wherein the first binder is selected from at least one of: a copolymer polymerized with propenoic acid, butadiene and phenylethylene, a copolymer polymerized with phenylethylene and methyl methacrylate, and a copolymer polymerized with phenylethylene, 2-ethylhexyl acrylate, methyl methacrylate and butylacrylate.

13. The negative electrode plate according to of claim 4, wherein the second binder is selected from a homopolyer polymerized with one monomer of butadiene, phenylethylene, propenoic acid, vinyl cyanide, acrylamide, acrylic ester, methacrylate, a copolymer polymerized with at least two of the monomers or a modified product of the homopolyer or the copolymer.

14. The negative electrode plate according to of claim 13, wherein the second binder is selected from at least one of: the copolymer polymerized with propenoic acid, butadiene and phenylethylene, a copolymer polymerized with propenoic acid and acrylamide, a copolymer polymerized with propenoic acid, vinyl cyanide, and acrylamide, the copolymer polymerized with phenylethylene and methyl methacrylate, and the copolymer polymerized with phenylethylene, 2-ethylhexyl acrylate, methyl methacrylate and butylacrylate.

15. The negative electrode plate according to claim 1, wherein the charging capacity of the first negative active material is weaker than that of the second negative active material.

16. The negative electrode plate according to claim 1, wherein a thickness ratio of the first negative active material layer to the second negative active material layer is 2~8:8~2.

17. A lithium ion battery, comprising the negative electrode plate according to claim 1.

18. The negative electrode plate according to claim 1, wherein a length of the negative current collector ranges from 80 cm to 170 cm, and a width of the negative current collector ranges from 10 mm to 150 mm.

\* \* \* \* \*